United States Patent
Mukae

(10) Patent No.: US 12,397,932 B2
(45) Date of Patent: Aug. 26, 2025

(54) PROPELLANT MANAGEMENT METHOD AND SATELLITE CONSTELLATION FORMING SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/789,226

(22) PCT Filed: Feb. 16, 2021

(86) PCT No.: PCT/JP2021/005619
§ 371 (c)(1),
(2) Date: Jun. 27, 2022

(87) PCT Pub. No.: WO2021/166876
PCT Pub. Date: Aug. 26, 2021

(65) Prior Publication Data
US 2023/0030579 A1    Feb. 2, 2023

(30) Foreign Application Priority Data

Feb. 17, 2020  (JP) ................... 2020-024455

(51) Int. Cl.
*B64G 1/10*      (2006.01)
*B64G 1/24*      (2006.01)
*B64G 1/62*      (2006.01)

(52) U.S. Cl.
CPC ............. *B64G 1/10* (2013.01); *B64G 1/2429* (2023.08); *B64G 1/62* (2013.01)

(58) Field of Classification Search
CPC . B64G 1/10; B64G 1/62; B64G 1/242; B64G 1/2429
See application file for complete search history.

(56) References Cited

U.S. PATENT DOCUMENTS

| | | | |
|---|---|---|---|
| 9,519,873 B2* | 12/2016 | Platzer | G06Q 10/02 |
| 10,551,503 B2* | 2/2020 | Porretta | G01S 19/258 |

(Continued)

FOREIGN PATENT DOCUMENTS

| | | | |
|---|---|---|---|
| JP | H2-296598 A | 12/1990 | |
| JP | 2001-066175 A | 3/2001 | |
| JP | 2017-114159 A | 6/2017 | |
| WO | WO-2012092933 A1 * | 7/2012 | ............ B64G 1/222 |
| WO | 2020/021696 A1 | 1/2020 | |

OTHER PUBLICATIONS

"Communications Satellites: Making the Global Village Possible", NASA, Last updated Nov. 20, 2010, https://history.nasa.gov/satcomhistory.html (Year: 2010).*

(Continued)

*Primary Examiner* — Joshua J Michener
*Assistant Examiner* — Katherine June Walter
(74) *Attorney, Agent, or Firm* — XSENSUS LLP

(57) ABSTRACT

An object is to prevent satellites constituting a mega-constellation from remaining in outer space in large numbers after completing their missions. An artificial satellite includes a propulsion device. The artificial satellite has propellant to be used by the propulsion device, and the propellant is in an amount required for the artificial satellite to operate in orbit for a first period of L1 years, which is a satellite design life, and then enter the atmosphere within a period less than the first period of years after deorbit. A ground facility controls the artificial satellite so that the artificial satellite has the amount of propellant required to operate in orbit for the first period of L1 years, which is the satellite design life, and then enter the atmosphere within a period of less than the first period of L1 years after deorbit.

4 Claims, 14 Drawing Sheets

(56) References Cited

U.S. PATENT DOCUMENTS

| | | | | |
|---|---|---|---|---|
| 2005/0205717 A1* | 9/2005 | Salvatore | ............... | B64G 1/402 244/169 |
| 2017/0160120 A1* | 6/2017 | Core | ...................... | B64G 1/402 |
| 2018/0354658 A1 | 12/2018 | Rossettini et al. | | |
| 2018/0370658 A1 | 12/2018 | Amimoto et al. | | |
| 2021/0253278 A1 | 8/2021 | Yamamoto et al. | | |

OTHER PUBLICATIONS

Lysenko, "The Analysis of Possibility of Integration the Global Information Satellite Systems Second Generation with Regional Systems on the Basis of Modern Small and Micro Spacecrafts", 2017 International Conference on Mechanical, System and Control Engineering (Year: 2017).*

Maier, "Launch and Production Schedule Modeling for Sustained Earth Observation Constellations", 2018, IEEE (Year: 2018).*

Palmerini, "Guidelines for Active Removal of Non-Functional Targets Designed to Assist Rendezvous and Capture", 2016, IEEE (Year: 2016).*

Sweeting, "Modern Small Satellites—Changing the Economics of Space", Feb. 26, 2018, Proceedings of the IEEE (Year: 2018).*

International Search Report and Written Opinion mailed on May 11, 2021, received for PCT Application PCT/JP2021/005619, filed on Feb. 16, 2021, 9 pages including English Translation.

Office Action issued on Dec. 20, 2022, in corresponding Japanese patent Application No. 2022-501890, 5 pages.

Japanese Office Action issued Apr. 16, 2024 in corresponding Japanese Patent Application No. 2023-073972, 5 pages.

* cited by examiner

PROPELLANT MANAGEMENT METHOD AND SATELLITE CONSTELLATION FORMING SYSTEM

CROSS-REFERENCE TO RELATED APPLICATION

The present application is based on PCT filing PCT/JP2021/005619, filed Feb. 16, 2021, which claims priority to JP 2020-024455, filed Feb. 17, 2020, the entire contents of which are incorporated herein by reference.

TECHNICAL FIELD

The present disclosure relates to an artificial satellite, a propellant management method, a ground facility, and a management business device.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

There has so far been a risk that satellites constituting a mega-constellation may remain in outer space in large numbers after completing their missions in orbit.

However, Patent Literature 1 does not describe a method for preventing satellites constituting a mega-constellation from remaining in outer space in large numbers after completing their missions.

An object of the present disclosure is to prevent satellites constituting a mega-constellation from remaining in outer space in large numbers after completing their missions.

Solution to Problem

An artificial satellite according to the present disclosure includes a propulsion device, and
the artificial satellite has propellant to be used by the propulsion device, the propellant being in an amount required for the artificial satellite to operate in orbit for a first period of years, which is a satellite design life, and then enter an atmosphere within a period less than the first period of years after deorbit.

Advantageous Effects of Invention

With artificial satellites according to the present disclosure, there is an effect that satellites that have completed their missions can be prevented from remaining in outer space in large numbers.

DESCRIPTION OF EMBODIMENTS

Figure 1:
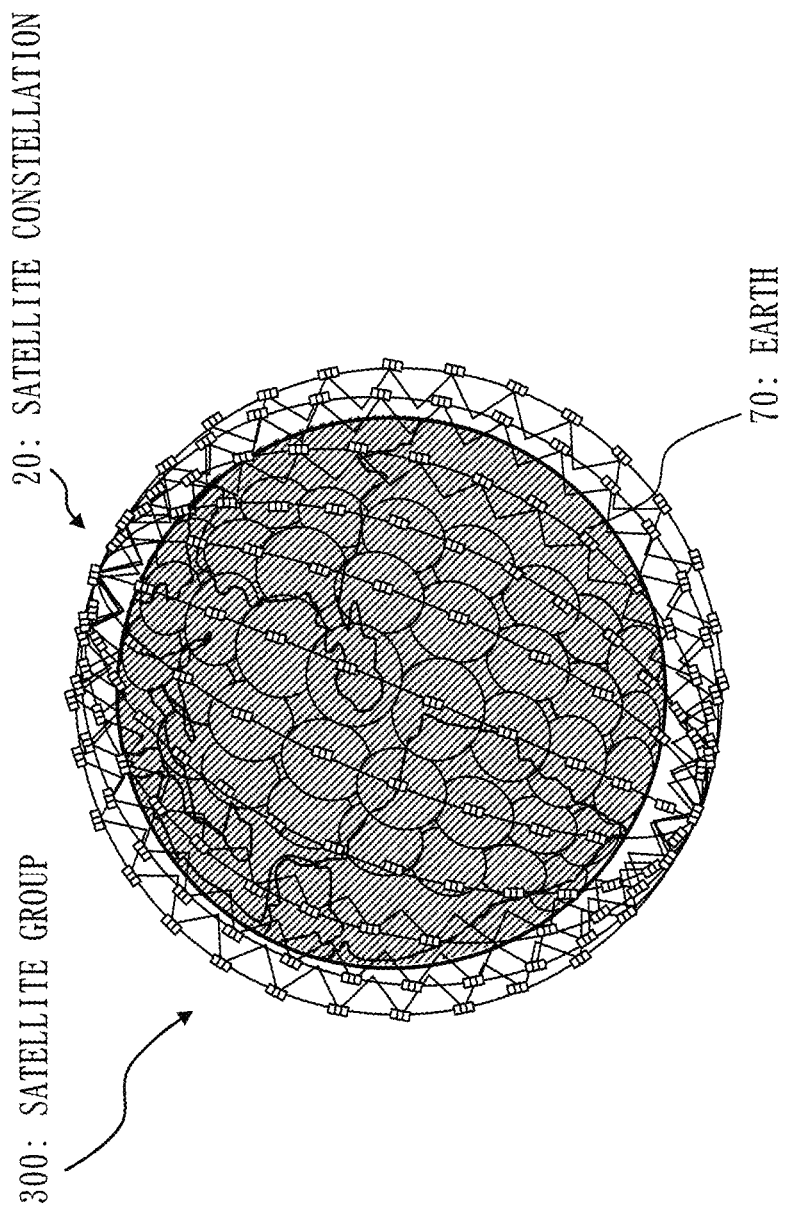
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

Examples of a satellite constellation assumed for a space traffic management system according to the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
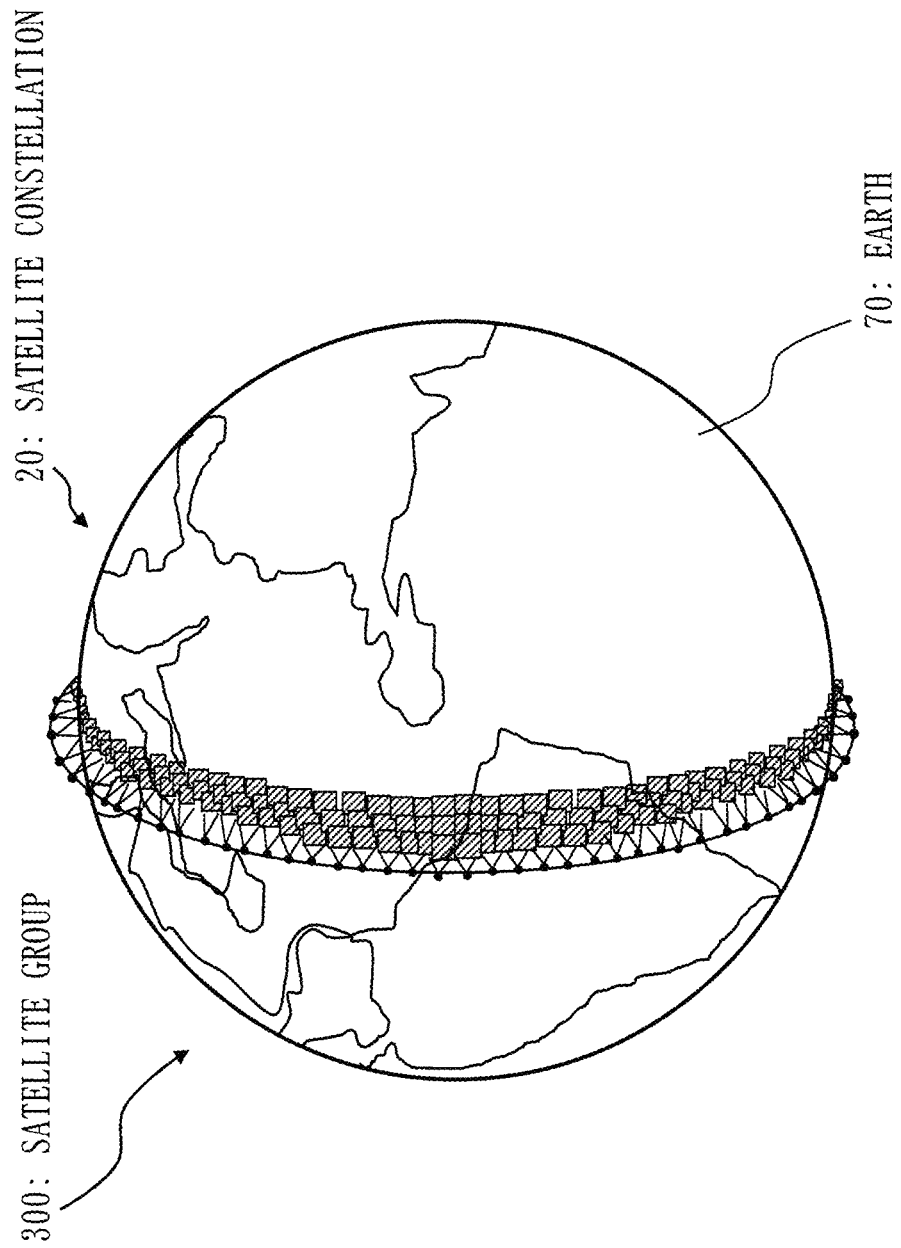
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
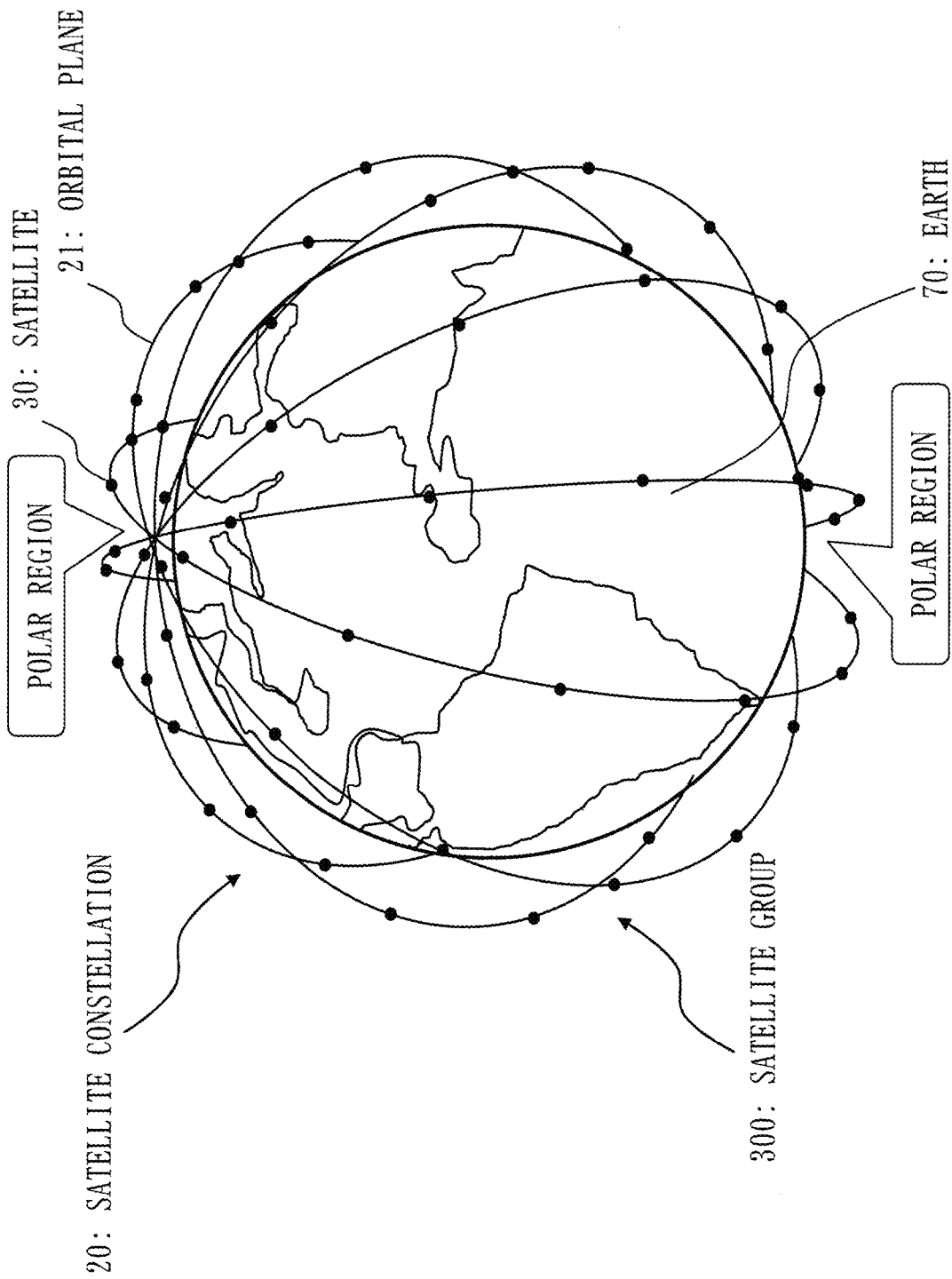
FIG. 3 is an example of a satellite constellation having a plurality of orbital planes that intersect in the vicinity of the polar regions.
Figure 4:
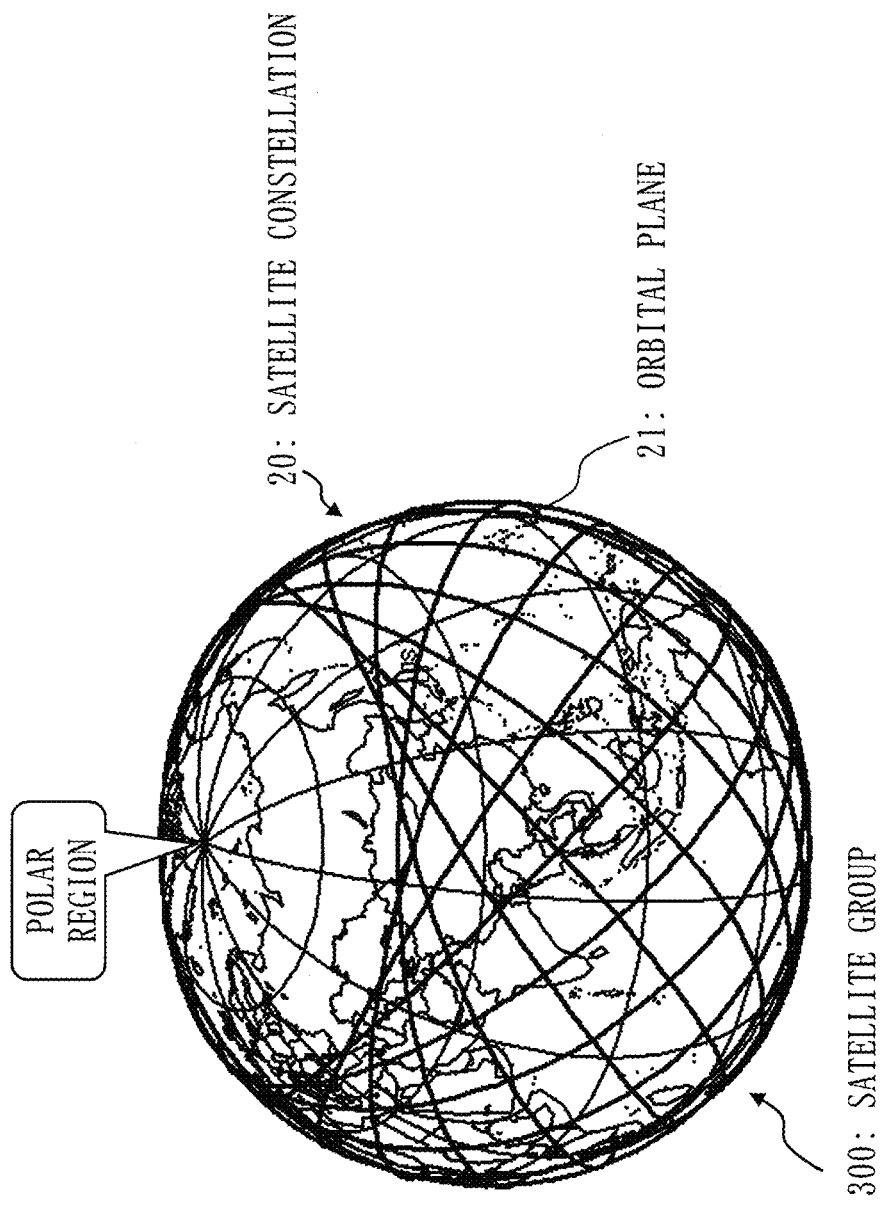
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is an example of an artificial satellite, and a satellite may be interpreted as an artificial satellite in this embodiment.

For example, satellites 30 constitute a mega-constellation, which is a satellite constellation composed of 100 or more artificial satellites.

Referring to FIGS. 5 to 8, an example of a satellite 30 and a ground facility 700 in a satellite constellation forming system 600 that forms a satellite constellation 20 will be described. For example, the satellite constellation forming system 600 is a management business device operated by a business operator that conducts a satellite constellation business, such as a mega-constellation business device, an LEO constellation business device, or a satellite business device. LEO is an abbreviation for Low Earth Orbit.

*Description of Configurations*

Figure 5:
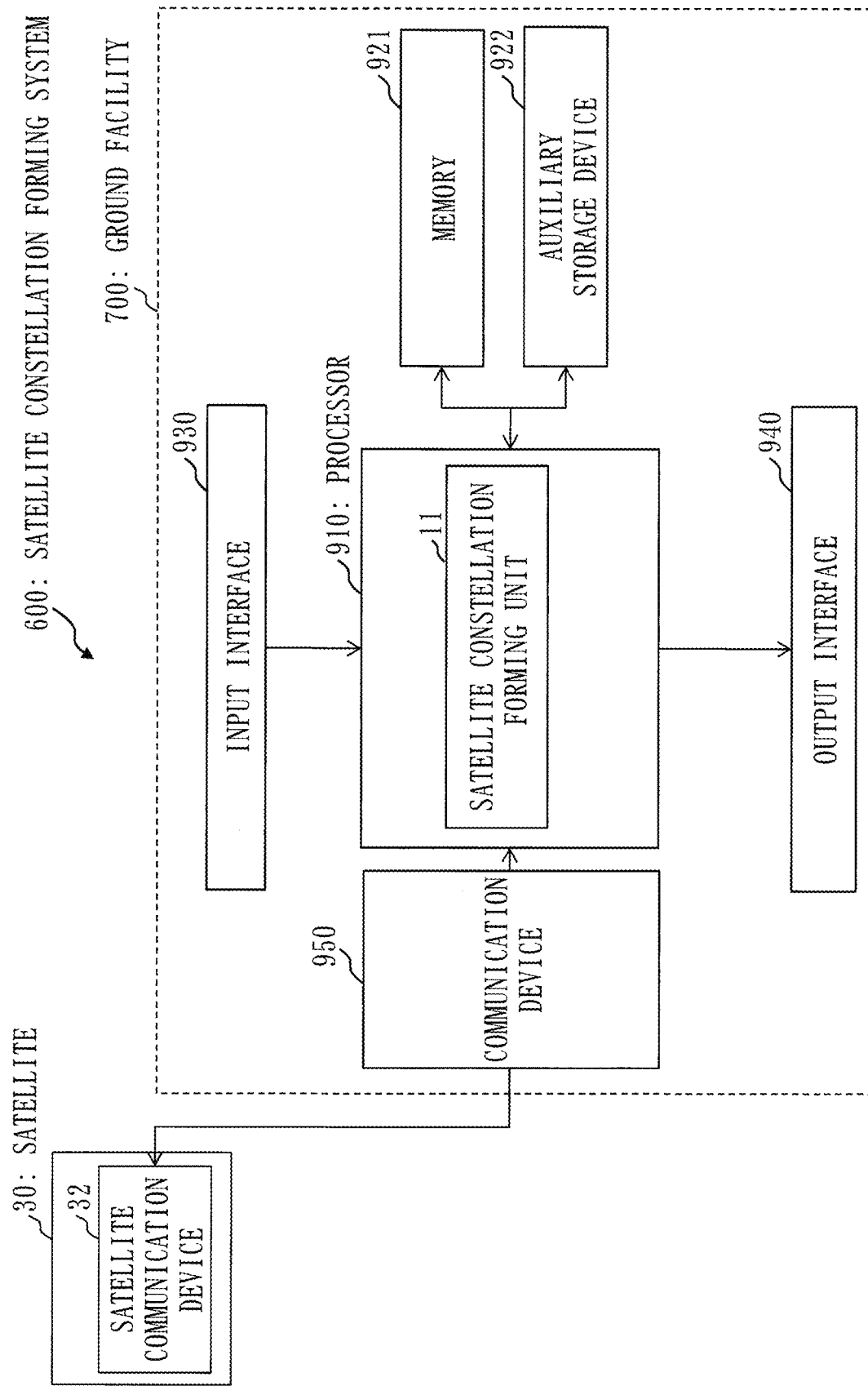
FIG. 5 is a configuration diagram of a satellite constellation forming system.

FIG. 5 is a configuration diagram of the satellite constellation forming system 600 that forms a mega-constellation composed of satellites 30 according to this embodiment.

The satellite constellation forming system 600 includes a computer. FIG. 5 illustrates a configuration with one computer but, in practice, a computer is provided in each satellite 30 of a plurality of satellites forming the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the satellite 30 and the ground facility 700. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components. The hardware of the satellite constellation forming system 600 is substantially the same as the hardware of the ground facility 700 to be described later with reference to FIG. 8.

The satellite constellation forming system 600 includes a satellite constellation forming unit 11 as a functional element. The functions of the satellite constellation forming unit 11 are realized by hardware or software.

The satellite constellation forming unit 11 controls formation of the satellite constellation 20 while communicating with the satellite 30.

Figure 6:
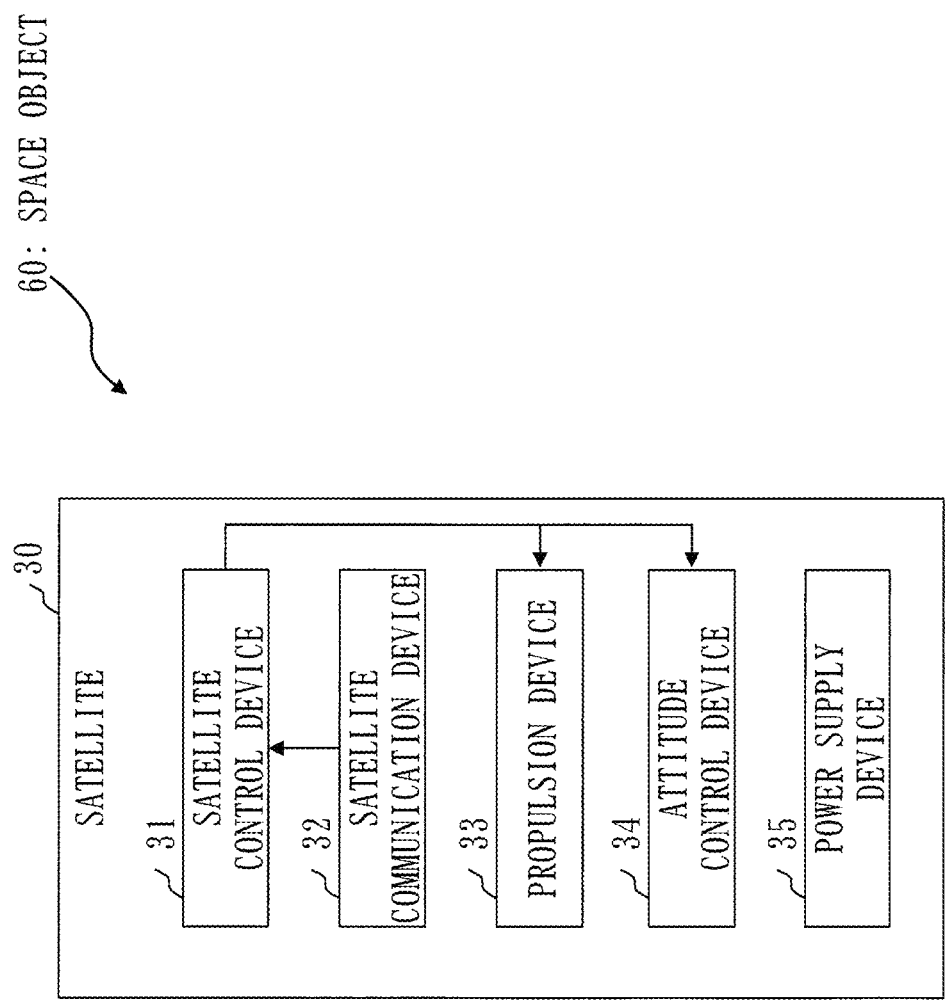
FIG. 6 is a configuration diagram of a satellite of the satellite constellation forming system.

FIG. 6 is a configuration diagram of the satellite 30 according to this embodiment.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 is a device that communicates with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is a chemical propulsion device or an electronic propulsion device.

The chemical propulsion device is a thruster using monopropellant or bipropellant fuel. The electronic propulsion device is an ion engine or a Hall thruster.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

The satellite 30 according to this embodiment has propellant to be used by the propulsion device 33, and the propellant is in an amount required for the satellite 30 to operate in orbit for a first period of years, which is a satellite design life, and then enter the atmosphere within a period of less than the first period of years after deorbit.

A propellant management method of this embodiment is a method in which the satellite 30 has propellant to be used by the propulsion device 33, and the propellant is in an amount required for the satellite 30 to operate in orbit for the first period of years, which is the satellite design life, and then enter the atmosphere within a period less than the first period of years after deorbit.

The satellite design life is a period during which the satellite is operable in orbit, and is also referred to as a satellite in-orbit life or simply as a design life.

Figure 7:
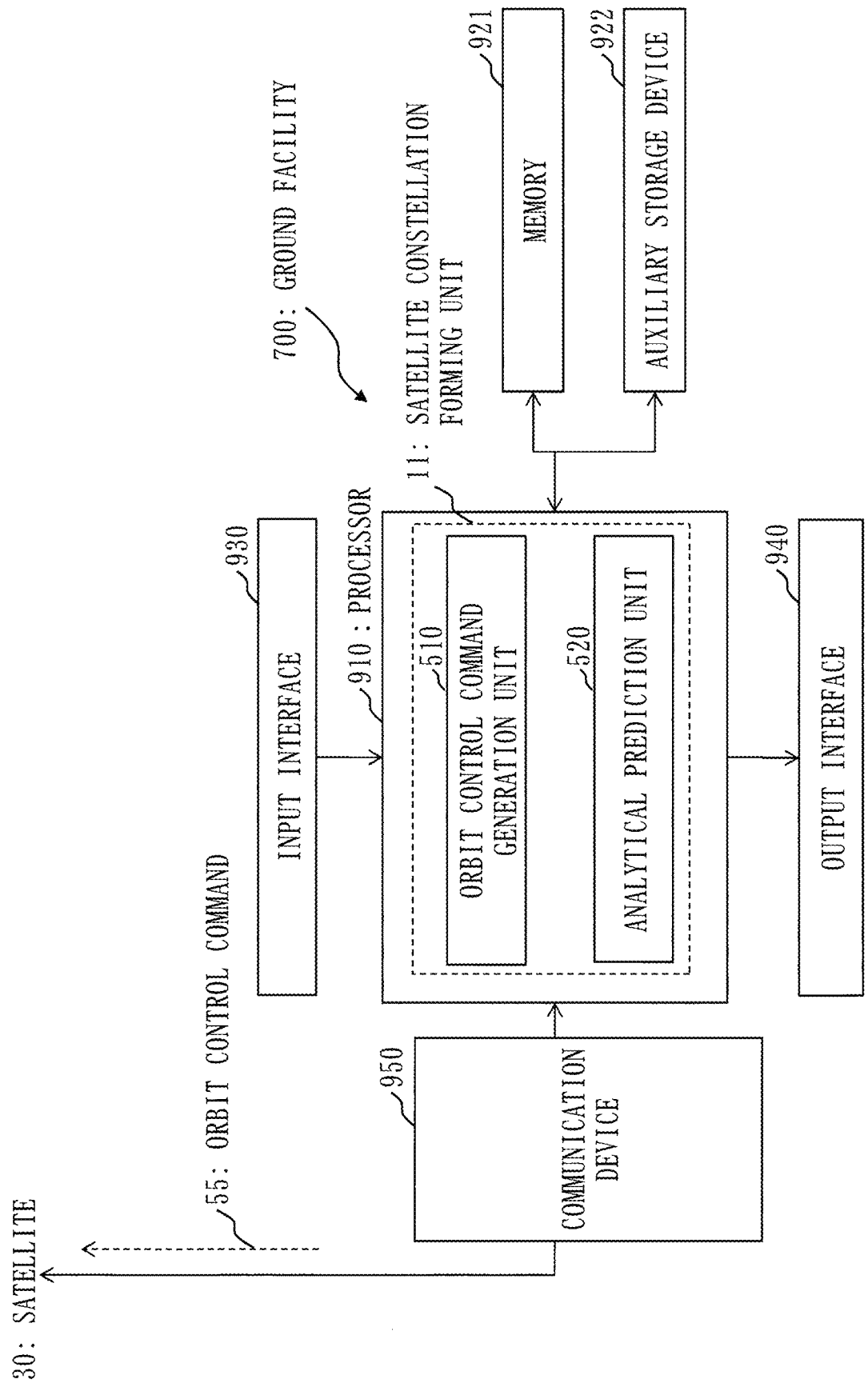
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 will be described later with reference to FIG. 8.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
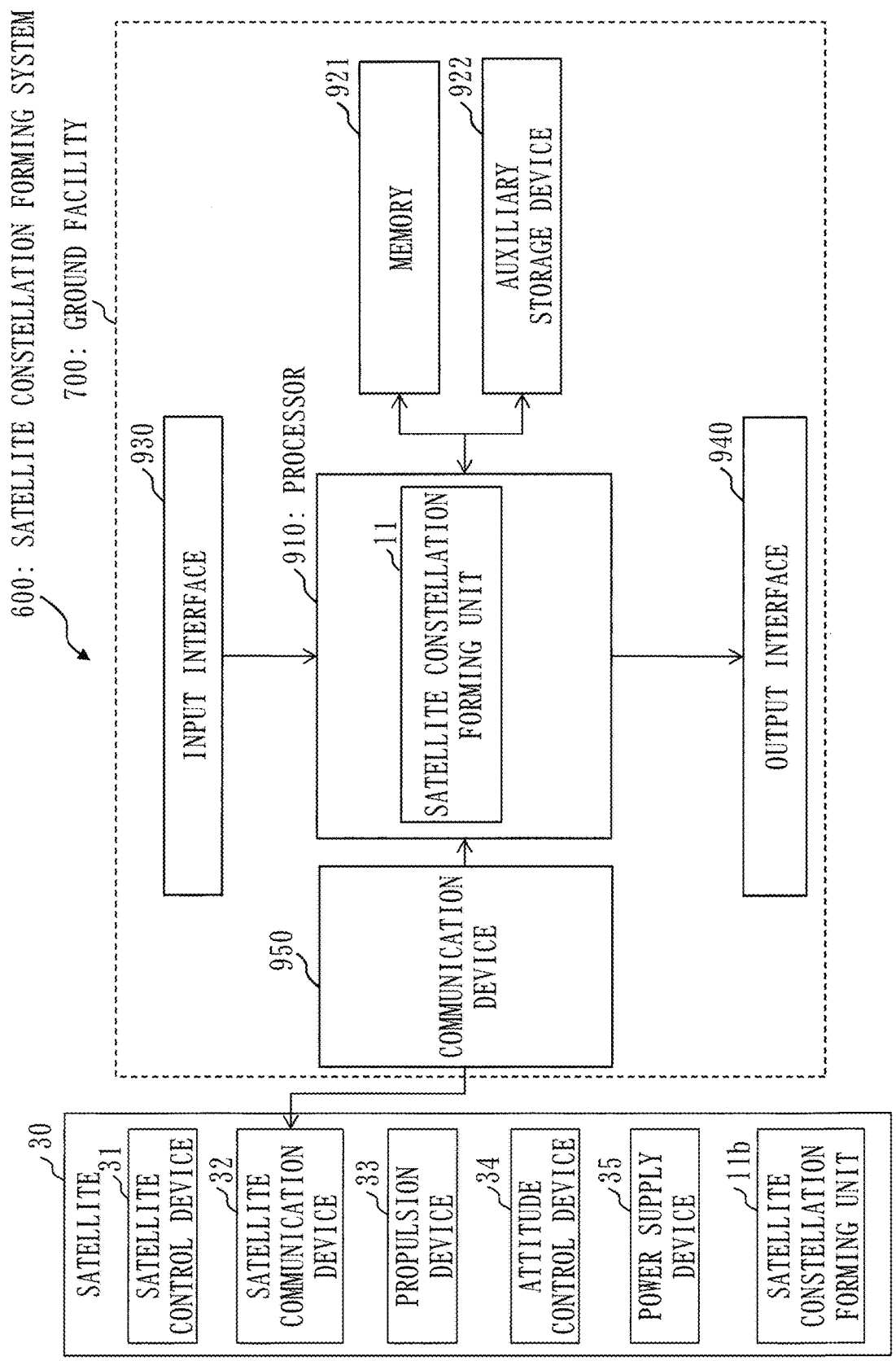
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of the plurality of satellites and the satellite constellation forming unit 11 included in the ground facility 700. The satellite constellation forming unit 11b of the satellite 30 may be included in the satellite control device 31.

The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components.

The processor 910 is a device that executes a satellite control program to control the satellite 30. The satellite control program is a program that realizes the functions of the constituent elements of the ground facility 700.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device 941, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC).

The satellite control program is read into the processor 910 and executed by the processor 910. The memory 921 stores not only the satellite control program but also an operating system (OS). The processor 910 executes the satellite control program while executing the OS. The satellite control and the OS may be stored in the auxiliary storage device 922. The satellite control program and the OS that are stored in the auxiliary storage device 922 are loaded into the memory 921 and executed by the processor 910. Part or the entirety of the satellite control program may be embedded in the OS.

The ground facility 700 may include a plurality of processors as an alternative to the processor 910. These processors share the execution of the satellite control program. Each of the processors is, like the processor 910, a device that executes the satellite control program.

Data, information, signal values, and variable values that are used, processed, or output by the satellite control program are stored in the memory 921 or the auxiliary storage device 922, or stored in a register or a cache memory in the processor 910.

"Unit" of each unit of the ground facility may be interpreted as "process", "procedure", "means", "phase", or "step". "Process" of each process such that "unit" of each unit is interpreted as "process" may be interpreted as "program", "program product", "computer readable storage medium storing a program", or "computer readable recording medium recording a program". The terms "process", "procedure", "means", "phase", and "step" can be interpreted interchangeably.

The satellite control program causes a computer to execute each process, each procedure, each means, each phase, or each step, where "unit" of each unit of the ground facility 700 is interpreted as "process", "procedure", "means", "phase", or "step". A satellite control method is a method performed by execution of the satellite control program by the ground facility 700.

The satellite control program may be stored and provided in a computer readable recording medium. Alternatively, the satellite control program may be provided as a program product.

The ground facility 700 according to this embodiment controls the satellite 30 including the propulsion device 33. The ground facility 700 controls the satellite 30 so that the satellite 30 has the amount of propellant required for the satellite 30 to operate in orbit for the first period of years, which is the satellite design life, and then enter the atmosphere within a period of less than the first period of years after deorbit.

Figure 9:
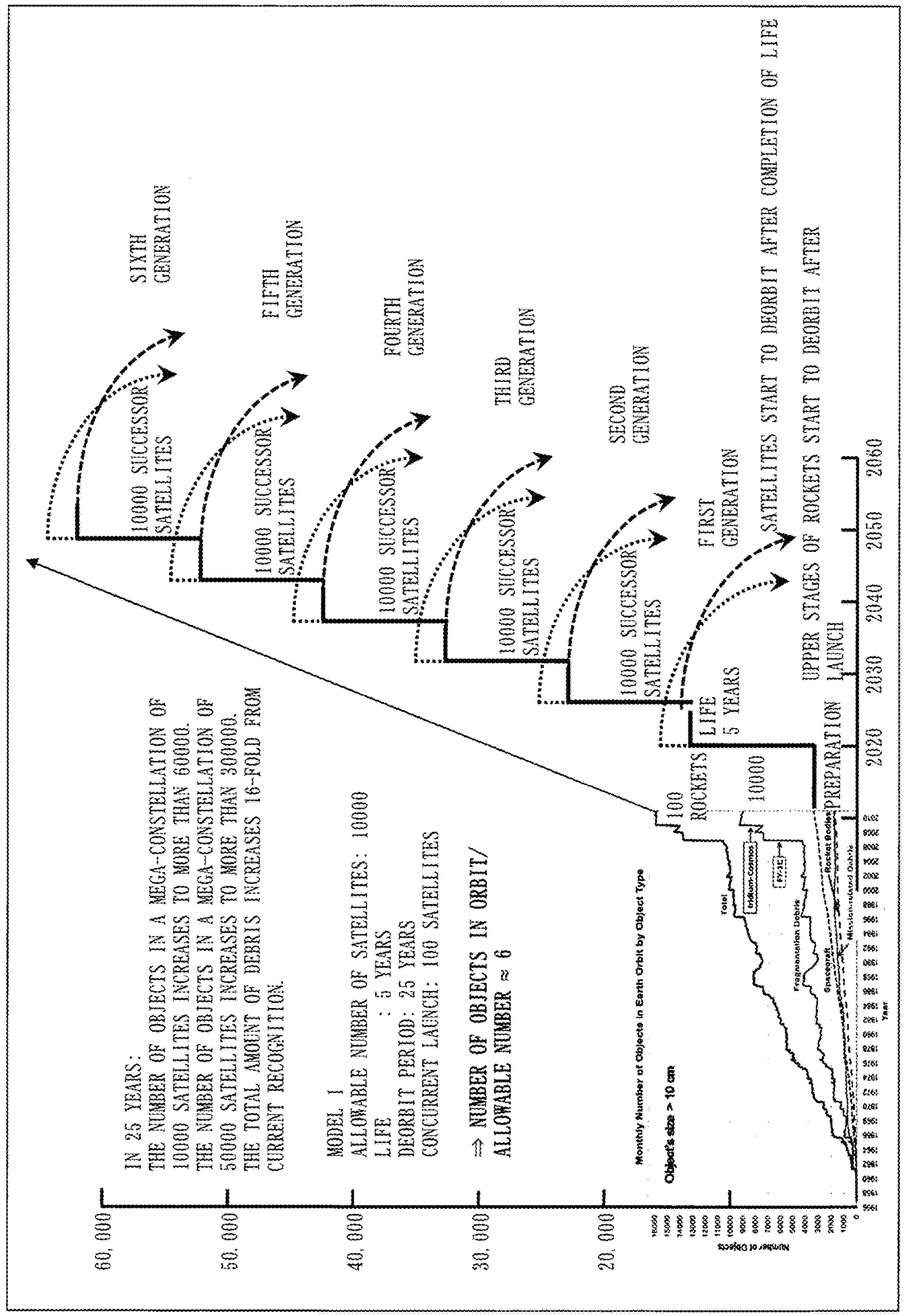
FIG. 9 is a diagram illustrating changes in the number of space objects due to launch of a mega-constellation, which is a comparison example for Embodiment 1.

FIG. 9 is a diagram illustrating changes in the number of space objects due to launch of a mega-constellation, which is a comparison example for this embodiment.

Due to the emergence of mega-constellations, there is a concern that the number of objects in orbit will increase dramatically.

According to the Space Debris Mitigation Guidelines by the IADC, it is specified that satellites after completing their missions in orbit should be made to enter the atmosphere within 25 years. The IADC is an abbreviation for the Inter-Agency Space Debris Coordination Committee. It is assumed that 10000 satellites have a design life of 5 years, and if these first-generation satellites complete their missions in orbit and then deorbit to enter the atmosphere, the first-generation satellites remain in outer space for a total of 30 years.

At the time when 10000 second-generation satellites are launched to continue services, the number of satellites in orbit is 20000 satellites. In this way, the number of objects in obit increases to a number exceeding 20000 including upper stages of rockets. If up to sixth-generation satellites are launched similarly before the first-generation satellites enter the atmosphere, this results in a situation where the number of objects in orbit exceeds 60000. It has been pointed out that if a collision accident in orbit occurs in a situation where the number of objects in orbit is excessive, it may induce the Kessler syndrome in which chain-reaction collisions occur endlessly. Therefore, it is necessary to avoid a situation where the number of objects in orbit increases sixfold in 30 years.

Figure 10:
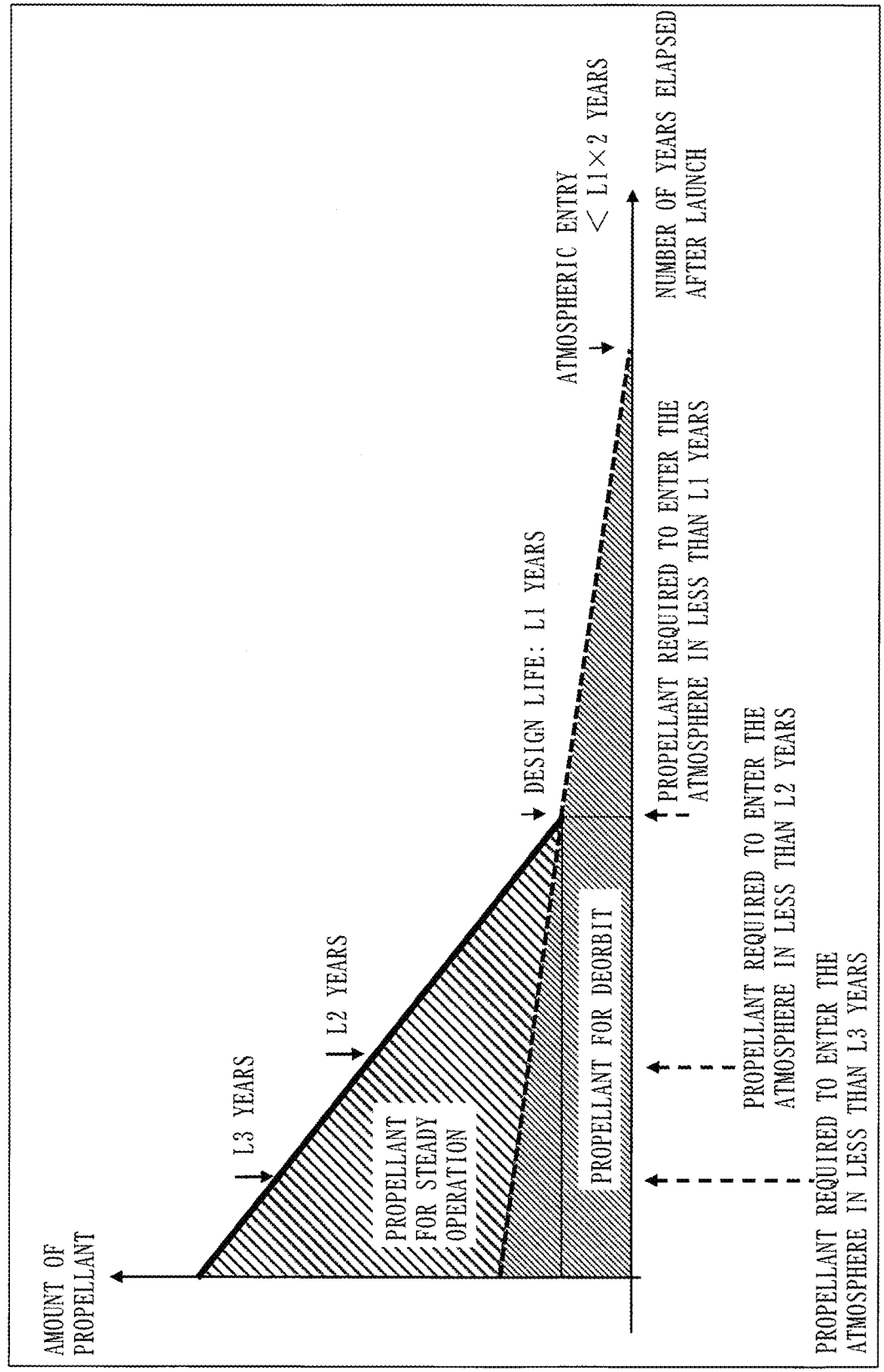
FIG. 10 is a diagram illustrating a relationship between the amount of propellant in a satellite according to Embodiment 1 and the number of years elapsed after launch.

FIG. 10 is a diagram illustrating a relationship between the amount of propellant in the satellite 30 according to this embodiment and the number of years elapsed after launch.

Figure 11:
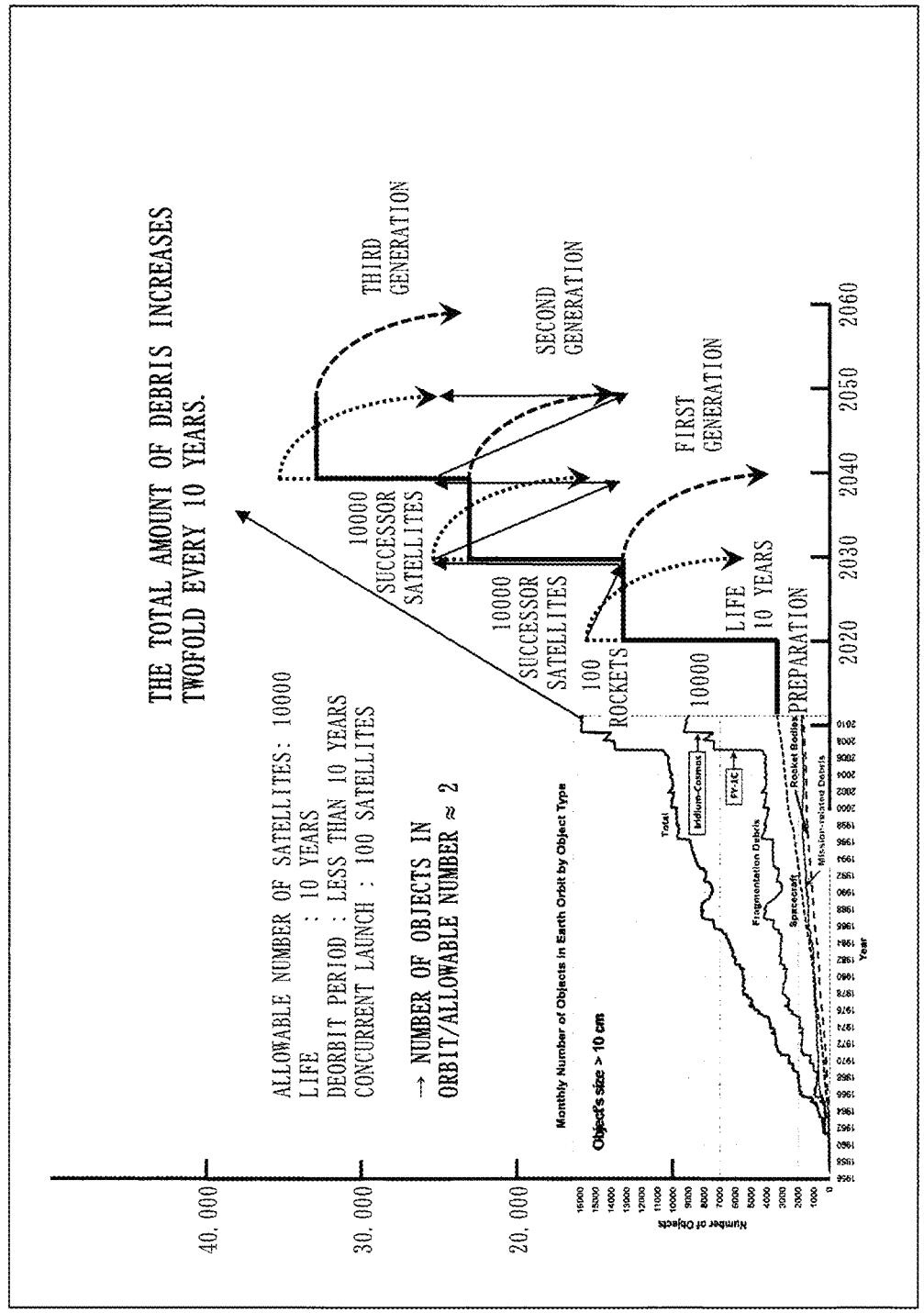
FIG. 11 is a diagram illustrating changes in the number of space objects due to launch of a mega-constellation composed of satellites according to Embodiment 1.

FIG. 11 is a diagram illustrating changes in the number of space objects due to launch of a mega-constellation composed of the satellites 30 according to this embodiment.

As a countermeasure against an increase in the number of objects in orbit, the satellite in-orbit life is set to be longer than a deorbit period during which satellites after completing their missions are to be made to enter the atmosphere. In this case, at the time of launch of second-generation satellites, first-generation satellites remain in outer space, so that the total number of space objects increases slightly more than twofold. However, at the time of launch of third-generation satellites, the first-generation satellites enter the atmosphere. Therefore, the total number of space objects is maintained at a number slightly more than twofold, and a risk of monotonous increases due to subsequent generation changes can be eliminated.

As indicated in FIG. 10, the satellite 30 according to this embodiment has the amount of propellant required to operate in orbit for a first period of L1 years, which is the satellite design life, and then enter the atmosphere within a period less than the first period of L1 years after deorbit. In this way, if satellites with the first period of L1 years, which is the satellite design life, execute their missions in orbit for a duration of the first period of L1 years, and then can enter the atmosphere within a period of less than the first period of L1 years after deorbit, the total number of space objects is maintained at a number slightly more than twofold.

This embodiment realizes the propellant management method in which the satellite design life is longer than the deorbit period within which satellites after completing their missions in orbit are to be made to enter the atmosphere. That is, in the propellant management method of this embodiment, the satellites have the amount of propellant required to operate in orbit for the first period of L1 years, which is the satellite design life, and then enter the atmosphere within a period of less than the first period of L1 years after deorbit.

As indicated in FIG. 11, the first-generation satellites with the first period of 10 years, which is the satellite design life, execute their missions in orbit for about 10 years. Then, shortly before the first-generation satellites complete their missions in orbit, the second-generation satellites are launched. The first-generation satellites enter the deorbit period roughly around the same time when the second-generation satellites are launched. Since the first-generation satellites enter the atmosphere within a period of less than about 10 years after deorbit, the total number of space objects at this time is maintained at a number slightly larger than twofold. When the third-generation satellites are launched, the first-generation satellites have already entered the atmosphere, so that the total number of space objects is still maintained at a number slightly larger than twofold.

Figure 12:
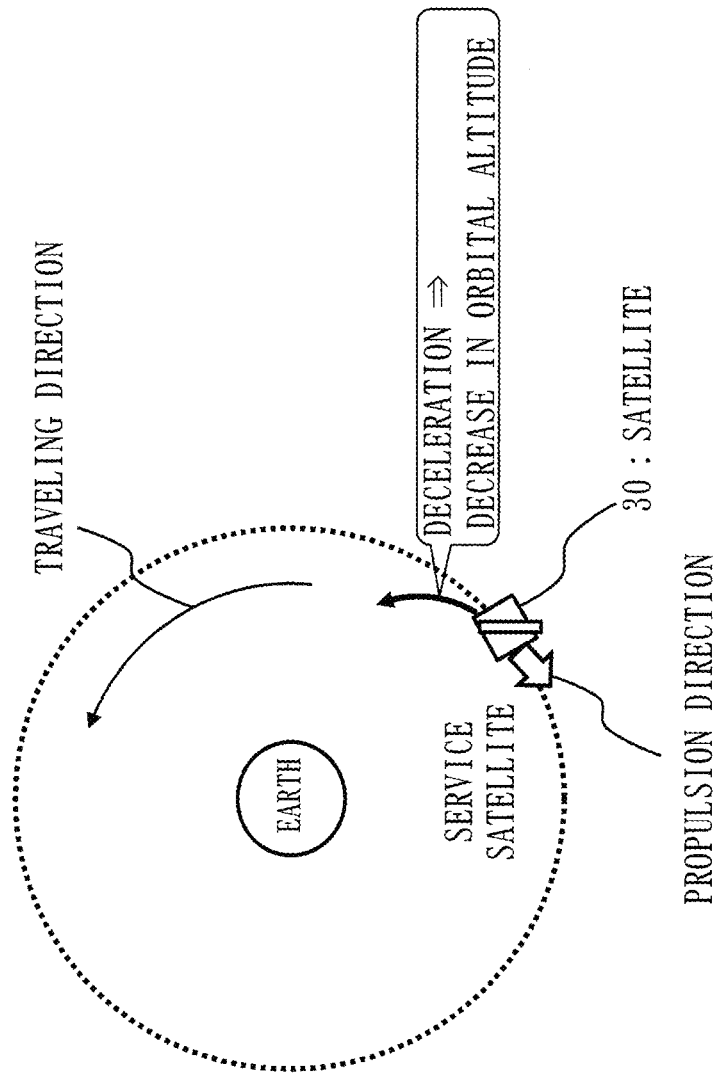
FIG. 12 is a diagram illustrating a method for shortening a deorbit period according to Embodiment 1.

FIG. 12 is a diagram illustrating a method for shortening the deorbit period according to this embodiment.

An effective method for shortening the deorbit period of the satellite 30 (artificial satellite) is to operate the propulsion device so as to achieve propulsion (obtain thrust) in a direction opposite to a traveling direction in orbit. The greater the amount of jet, the greater the effect of deceleration, so that a time period until atmospheric entry can be shortened. Therefore, the effect of shortening the deorbit period depends on the amount of propellant that is held at the time of deorbit.

*Description of Effects of This Embodiment*

As described above, with the artificial satellite, the propellant management method, and the ground facility according to this embodiment, the number of objects in orbit in a mega-constellation can be maintained at a number slightly larger than twofold of the number of satellites in steady operation, so that there is an effect that the Kessler syndrome can be prevented. The ground facility that executes the propellant management method is, for example, a management business device such as a mega-constellation business device, an LEO constellation business device, or a satellite business device.

In the artificial satellite, the propellant management method, and the ground facility according to this embodiment, the artificial satellite has the propellant required to operate in orbit for the L1 years of the satellite design life, and then enter the atmosphere within a period of less than the L1 years.

In this embodiment, an example in which artificial satellites deorbit after completing the design life is presented. At the time of completion of operation for the L1 years of the satellite design life, the artificial satellites have the propellant required to enter the atmosphere in less than the L1 years after deorbit. Therefore, the satellites enter the atmosphere before further successor satellites of successor satellites are launched, so that there is an effect that a risk that the number of objects in orbit continues to increase can be eliminated.

*Other Configurations*

In this embodiment, the functions of the ground facility 700 are realized by software. As a variation, the functions of the ground facility 700 may be realized by hardware.

Figure 13:
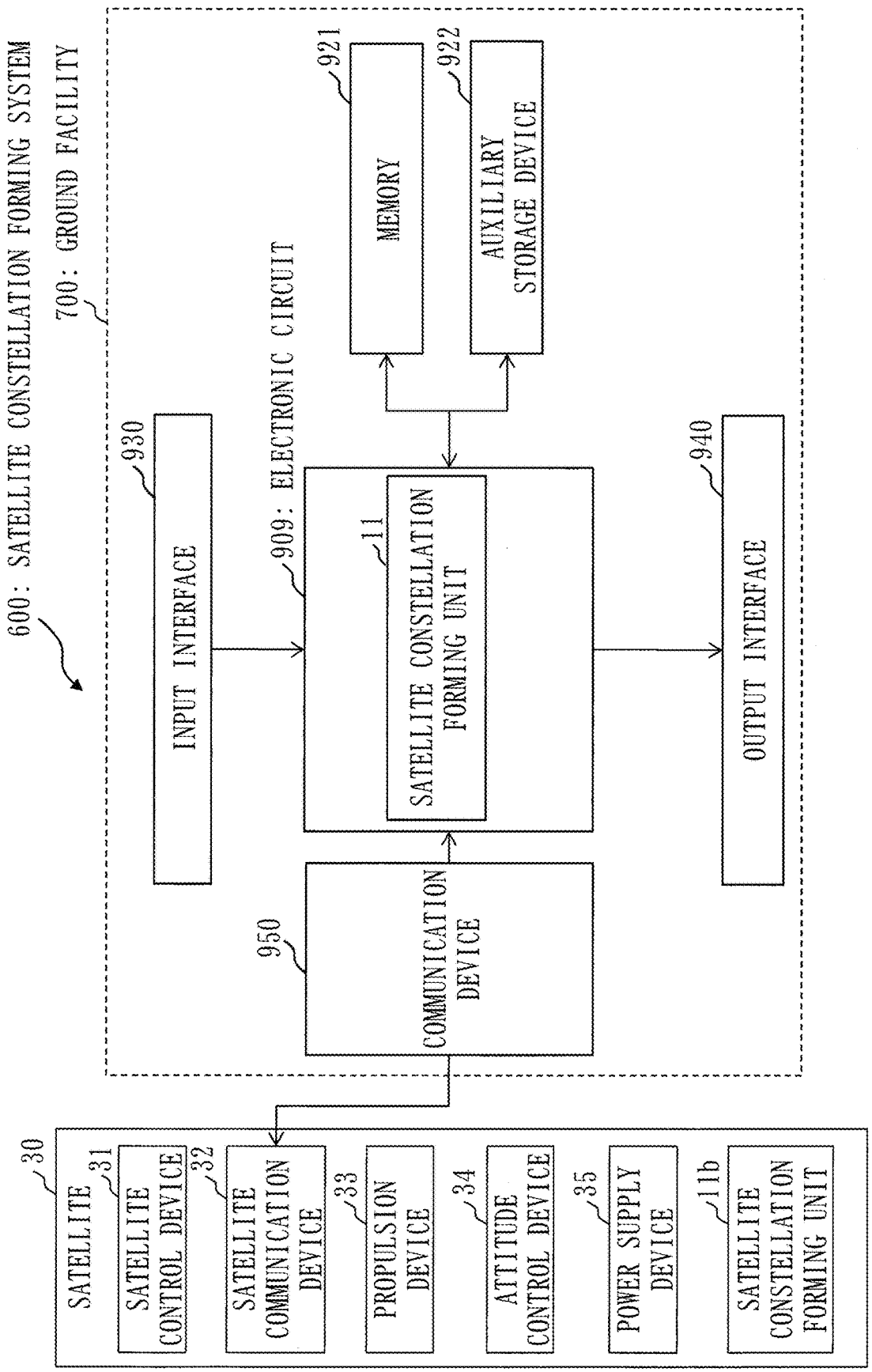
FIG. 13 is a configuration diagram of a ground facility 700 according to a variation of Embodiment 1.

FIG. 13 is a diagram illustrating a configuration of the ground facility 700 according to a variation of this embodiment.

The ground facility 700 includes an electronic circuit 909 in place of the processor 910.

The electronic circuit 909 is a dedicated electronic circuit that realizes the functions of the ground facility 700.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the ground facility 700 may be realized by one electronic circuit, or may be distributed among and realized by a plurality of electronic circuits.

As another variation, some of the functions of the ground facility 700 may be realized by the electronic circuit, and the rest of the functions may be realized by software.

Each of the processor and the electronic circuit is also called processing circuitry. That is, the functions of the ground facility 700 is realized by the processing circuitry.

Embodiment 2

In this embodiment, differences from Embodiment 1 and additions to Embodiment 1 will be mainly described.

In this embodiment, the components that have substantially the same functions as those in Embodiment 1 are denoted by the same reference signs, and description thereof will be omitted.

The configurations of the satellite 30, the satellite constellation forming system 600, and the ground facility 700 are substantially the same as those in Embodiment 1.

In this embodiment, a propellant management method for an artificial satellite in a case where the amount of propellant has diminished more than planned due to an accidental reason will be described. An accidental reason is, for example, that the propellant is consumed more than expected after launch and before atmospheric entry, or a leak of the propellant causes unexpected diminution. In the propellant management method according to this embodiment, the operation is terminated after operating in orbit for a period of L2 years as a result of continuing to operate with the remaining propellant, in anticipation of the amount of propellant required to enter the atmosphere in less than L2 years after deorbit.

Figure 14:
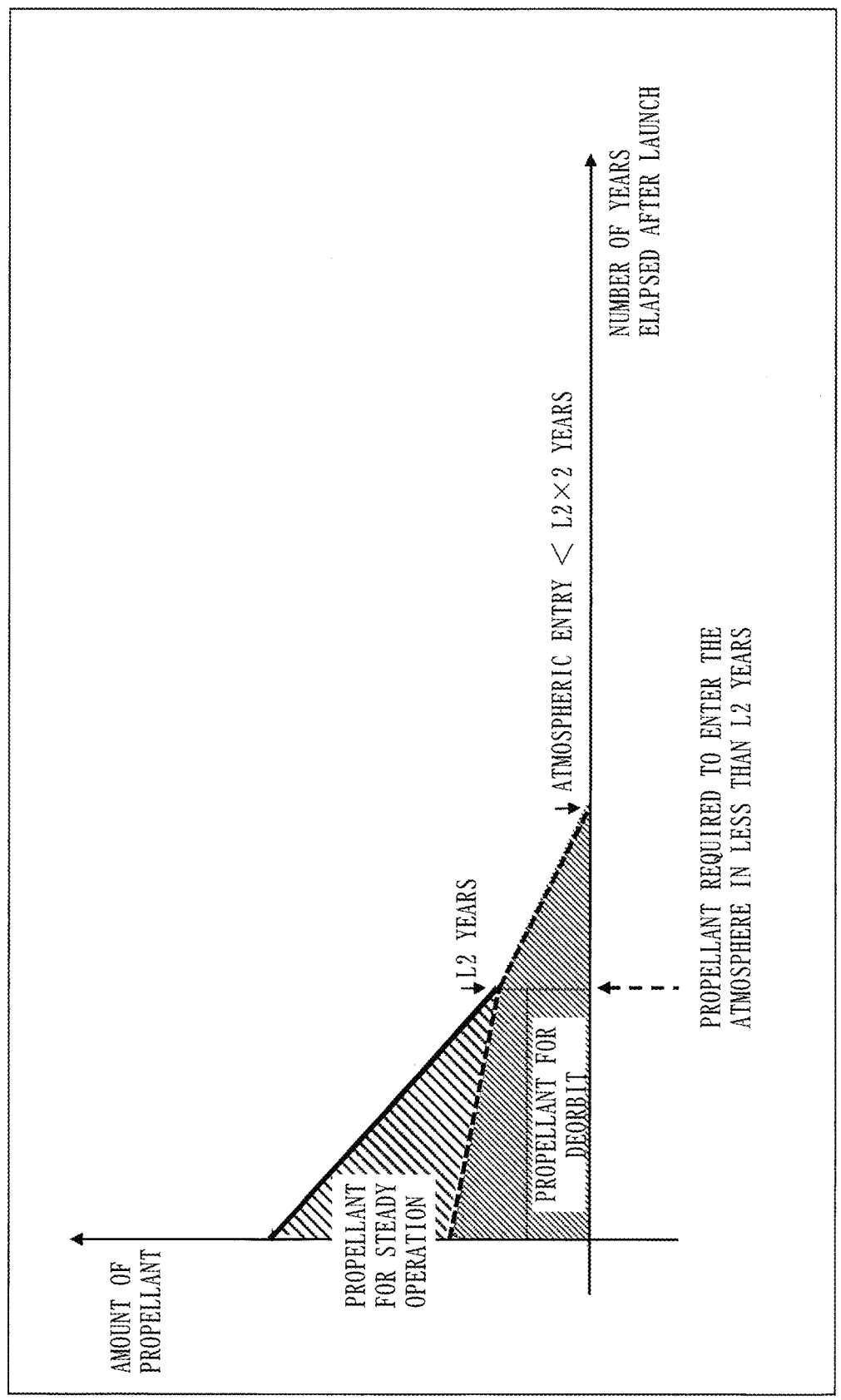
FIG. 14 is a diagram illustrating a relationship between the amount of propellant in a satellite according to Embodiment 2 and the number of years elapsed after launch.

FIG. 14 is a diagram illustrating a relationship between the amount of propellant in the satellite 30 according to this embodiment and the number of years elapsed after launch.

The satellite 30 according to this embodiment has the amount of propellant required to operate in orbit after launch of the satellite 30 for a second period of L2 years, which is shorter than the first period of L1 years of the satellite design life, and then enter the atmosphere in less than the second period of L2 years after deorbit.

The propellant management method according to this embodiment is the method in which the satellite 30 has the amount of propellant required to operate in orbit after launch of the satellite 30 for the second period of L2 years, which is shorter than the first period of L1 years of the satellite design life, and then enter the atmosphere in less than the second period of L2 years after deorbit.

The ground facility 700 according to this embodiment controls the satellite 30 so that the satellite 30 has the amount of propellant required to operate in orbit after launch of the satellite 30 for the L2 years, which is shorter than the L1 years of the satellite design life, and then enter the atmosphere in less than the L2 years after deorbit.

In FIG. 14, due to unexpected consumption of the propellant, the satellite 30 after operating in orbit for the L2 years, which is shorter than the L1 years of the satellite design life, has the propellant required to enter the atmosphere in a period of less than the L2 years after deorbit.

In the propellant management method according to this embodiment, the operation is terminated after operating in orbit for the period of L2 years as a result of continuing to operate with the remaining propellant, in anticipation that the amount of propellant held at that time point is the amount of propellant required to enter the atmosphere in less than L2 years after deorbit. As a result, the time period to remain in orbit is less than L2×2, so that there is an effect that a risk that the number of objects in orbit continues to increase can be eliminated.

For example, the ground facility 700 calculates whether the current amount of propellant is the amount of propellant required to enter the atmosphere in less than Lx years from the current time, based on the number, Lx, of years of operation in orbit up to the current time and the current amount of propellant. The ground facility 700 may determine termination of the in-orbit operation of the satellite, based on the amount of propellant required to enter the atmosphere in less than the Lx years from the current time.

As described above, according to the artificial satellite, the propellant management method, and the ground facility of this embodiment, even in a case of deorbit after operating in orbit for the L2 years, which is shorter than the design life, due to an accidental reason, the amount of propellant required to enter the atmosphere in less than the L2 years after deorbit is held. Therefore, there is an effect that a risk that the number of objects in orbit continues to increase can be eliminated, as in Embodiment 1.

Embodiment 3

In this embodiment, differences from Embodiments 1 and 2 and additions to Embodiments 1 and 2 will be mainly described.

In this embodiment, the components that have substantially the same functions as those in Embodiments 1 and 2 are denoted by the same reference signs, and description thereof will be omitted.

The configurations of the satellite 30, the satellite constellation forming system 600, and the ground facility 700 are substantially the same as those in Embodiment 1.

In this embodiment, an artificial satellite (satellite 30) with a satellite design life that is longer than a time period from deorbit to atmospheric entry will be described.

It is recommended that artificial satellites enter the atmosphere or move to an orbit, called a graveyard orbit, that does not adversely affect artificial satellites in steady operation, within 25 years from completion of their missions in orbit.

However, if the design life of a mega-constellation having more than 10000 satellites in steady operation is shorter than 25 years, the total number of objects in orbit increases more than threefold as described below. Specifically, first-generation satellites deorbit after completion of their missions, and second-generation satellites are launched and deorbit after completion of their missions. In a phase where third-generation satellites are launched, the first-generation satellites are still in the process of deorbiting. Therefore, the total number of objects in orbit increases more than threefold.

For example, if the design life is five years, the first-generation satellites remain in outer space until sixth-generation satellites are launched, so that the total number of objects in orbit increases sixfold. Therefore, the risk of collision between space objects increases, and there is also a risk that occurrence of an explosive collision may cause chain-reaction secondary collisions between scattered fragments, resulting in a situation, called the Kessler syndrome, where chain-reaction collisions occur endlessly.

An effective method for preventing this increase in the number of objects is to set the satellite design life of artificial satellites to be longer than the time period from deorbit to atmospheric entry.

In this case, since the first-generation satellites complete atmospheric entry before the second-generation satellites complete their design life, there is an effect that monotonous increases in the number of objects in the third and subsequent generations can be prevented.

As means for realizing extension of the satellite design life described above, effective measures for extending the design life period are measures such as to extend the life by increasing on-board propellant or by a redundant configuration, to improve design or production quality, and to extend the design life of on-board equipment or parts.

Another effective measure is to shorten the deorbit period by causing the propellant device to emit a jet in a direction opposite to the satellite travelling direction after completion of the mission.

In Embodiments 1 to 3 above, each unit of the ground facility has been described as an independent block. However, the configuration of the ground facility may be different from the configuration described in the above embodiments. The functional blocks of the ground facility may be arranged in any configuration, provided that the functions described in the above embodiments can be realized. The ground facility may be one device or may be a system composed of a plurality of devices.

Portions of Embodiments 1 to 3 may be implemented in combination. Alternatively, one portion of these embodiments may be implemented. These embodiments may be implemented as a whole or partially in any combination.

That is, in Embodiments 1 to 3, Embodiments 1 to 3 can be freely combined, any constituent elements can be modified, or any of the constituent elements can be omitted in Embodiments 1 to 3.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST satellite constellation; 21: orbital plane; 30: satellite; 31: satellite control device; 32: satellite communication device; 33: propulsion device; 34: attitude control device; 35: power supply device; 60: space object; 70: earth; 55: orbit control command; 600: satellite constellation forming system; 11, 11*b*: satellite constellation forming unit; 300: satellite group; 700: ground facility; 510: orbit control command generation unit; 520: analytical prediction unit; 909: electronic circuit; 910: processor; 921: memory; 922: auxiliary storage device; 930: input interface; 940: output interface; 941: display device; 950: communication device.

The invention claimed is:

1. A propellant management method for an artificial satellite including a propulsion device, comprising:
    storing propellant to be used by the propulsion device;
    controlling the propulsion device to deorbit the artificial satellite a first predetermined amount of time before an ending of a first period of years, which is a satellite design life,
    controlling the propulsion device to cause the artificial satellite to enter an atmosphere within a second predetermined amount of time after deorbit, the second predetermined amount of time being less than the first period of years,
    wherein the propellant is in an amount required for the artificial satellite to operate in orbit for the first period of years and then enter the atmosphere within the second predetermined amount of time after deorbit,
    wherein the satellite design life, within which the artificial satellite enters the atmosphere, is longer than the deorbit period of the artificial satellite,
    wherein the artificial satellite is a first-generation satellite belonging to a mega-constellation, which is a satellite constellation composed of 100 or more artificial satellites, and
    wherein the first period of years and the second predetermined amount of time are selected based on scheduled launch timing of subsequent generations of the mega-constellation to maintain a total number of objects in orbit at less than three times a number of satellites in steady operation; and
    in a case that a leak of the propellant causes unexpected diminution,
    calculating a third predetermined amount of time based on
        a current amount of propellant,
        a number of years of operation in orbit up to a current time, and
        a minimum amount of propellant required for atmospheric entry;
    determining, based on the current amount of propellant and the third predetermined amount of time, whether operation can be continued while maintaining the total number of objects in orbit at less than three times the number of satellites in steady operation;
    continuing operation of the artificial satellite in orbit until the earlier of expiration of the calculated third predetermined amount of time or detection that the current amount of propellant has reached the minimum amount of propellant required for atmospheric reentry;
    terminating operation; and
    controlling the propulsion device to deorbit the artificial satellite.

2. A propellant management method for a plurality of generations of artificial satellites, each having a propulsion device, in a satellite constellation system, comprising:
    controlling an artificial satellite, the artificial satellite being part of a first generation of satellites, to deorbit a first predetermined amount of time before an ending of a first period of years, which is a satellite design life,
    wherein the artificial satellite has propellant to be used by the propulsion device, the propellant being in an amount required for the artificial satellite to operate in orbit for the first period of years;
    launching one or more artificial satellites of a second generation of satellites during at least a portion of a deorbit period of the artificial satellite,
    controlling the artificial satellite to enter an atmosphere within a second predetermined amount of time after deorbit, the second predetermined amount of time being less than the first period of years; and
    launching one or more of a third generation of satellites after the artificial satellite enters the atmosphere,
    wherein the artificial satellite being part of the first generation of satellites belongs to a mega-constellation, which is a satellite constellation composed of 100 or more artificial satellites, and
    wherein the first period of years and the second predetermined amount of time are selected based on scheduled launch timing of subsequent generations of the mega-constellation to maintain a total number of objects in orbit at less than three times a number of satellites in steady operation; and
    in a case that a leak of the propellant causes unexpected diminution,
    calculating a third predetermined amount of time based on
        a current amount of propellant,
        a number of years of operation in orbit up to a current time, and
        a minimum amount of propellant required for atmospheric entry;
    determining, based on the current amount of propellant and the third predetermined amount of time, whether operation can be continued while maintaining the total number of objects in orbit at less than three times the number of satellites in steady operation;
    continuing operation of the artificial satellite in orbit until the earlier of expiration of the calculated third predetermined amount of time or detection that the current amount of propellant has reached the minimum amount of propellant required for atmospheric entry;
    terminating operation; and
    controlling the propulsion device to deorbit the artificial satellite.

3. A satellite constellation forming system to execute the propellant management method according to claim 1, the satellite constellation forming system being one of a mega-constellation business device, a Low Earth Orbit (LEO) constellation business device, or a satellite business device.

4. A satellite constellation forming system to execute the propellant management method according to claim 2, the satellite constellation forming system being one of a mega-constellation business device, a Low Earth Orbit (LEO) constellation business device, or a satellite business device.

* * * * *